United States Patent
Choi

(10) Patent No.: US 12,443,277 B2
(45) Date of Patent: Oct. 14, 2025

(54) MIRROR DISPLAY AND CONTROL METHOD THEREOF

(71) Applicant: SAMSUNG ELECTRONICS CO., LTD., Suwon-si (KR)

(72) Inventor: Hyeryoung Choi, Suwons-i (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/825,420

(22) Filed: Sep. 5, 2024

(65) Prior Publication Data

US 2025/0123684 A1    Apr. 17, 2025

Related U.S. Application Data

(63) Continuation of application No. PCT/KR2024/095969, filed on Aug. 1, 2024.

(30) Foreign Application Priority Data

Oct. 17, 2023  (KR) .................. 10-2023-0138915

(51) Int. Cl.
  *G06F 3/01*    (2006.01)
  *G02F 1/1333*  (2006.01)
  (Continued)

(52) U.S. Cl.
  CPC ............... *G06F 3/013* (2013.01); *G09G 3/36* (2013.01); *G02F 1/133308* (2013.01);
  (Continued)

(58) Field of Classification Search
  CPC .............................................. G09G 2354/00
  See application file for complete search history.

(56) References Cited

U.S. PATENT DOCUMENTS 9,552,013 B2   1/2017  Kim et al.
10,467,949 B2  11/2019 Han et al.
(Continued)

FOREIGN PATENT DOCUMENTS

KR   10-2018-0005063   1/2018
KR      10-1899323    9/2018
(Continued)

OTHER PUBLICATIONS

International Search Report dated Nov. 7, 2024 issued in PCT Application No. PCT/KR2024/095969.
(Continued)

*Primary Examiner* — Gustavo Polo
(74) *Attorney, Agent, or Firm* — STAAS & HALSEY LLP

(57) ABSTRACT

An electronic apparatus including a mirror display configured to be operated in a mirror state and a display state; a sensor; and at least one processor configured to switch an operation state of the electronic apparatus from a horizontal state, in which the mirror display is operated in a horizontal orientation, to a vertical state, in which the mirror display is operated in a vertical orientation, and, while the operation state of electronic apparatus is the vertical state, identify, based on data acquired through the sensor, whether a user is located within a predetermined distance of the electronic apparatus for a predetermined time, and, when it is identified that the user is located within the predetermined distance of the electronic apparatus for the predetermined time, control the mirror display to be operated in the mirror state based on a user gaze location.

20 Claims, 18 Drawing Sheets

(51) Int. Cl.
   *G02F 1/1335* (2006.01)
   *G09G 3/36* (2006.01)
(52) U.S. Cl.
   CPC .... *G02F 1/133531* (2021.01); *G02F 2203/02* (2013.01); *G09G 2320/06* (2013.01); *G09G 2330/027* (2013.01); *G09G 2340/0464* (2013.01); *G09G 2354/00* (2013.01)

(56) References Cited

U.S. PATENT DOCUMENTS

| | | |
|---|---|---|
| 11,257,467 B2 | 2/2022 | Kim et al. |
| 2014/0285498 A1 | 9/2014 | Kim et al. |
| 2018/0012537 A1 | 1/2018 | Han et al. |
| 2019/0191850 A1* | 6/2019 | Yoganandan ....... B26B 21/4056 |
| 2020/0372878 A1 | 11/2020 | Kim et al. |
| 2022/0072380 A1* | 3/2022 | Trehan ................... G06F 40/35 |

FOREIGN PATENT DOCUMENTS

| | | |
|---|---|---|
| KR | 10-1978220 | 5/2019 |
| KR | 10-2019-0067545 | 6/2019 |
| KR | 10-2012043 | 8/2019 |
| KR | 10-2021-0127337 | 10/2021 |
| KR | 10-2023-0060290 | 5/2023 |
| KR | 10-2023-0064346 | 5/2023 |
| KR | 10-2023-0089203 | 6/2023 |

OTHER PUBLICATIONS

Written Opinion dated Nov. 7, 2024 issued in PCT Application No. PCT/KR2024/095969.

* cited by examiner

Y: Y-AXIS OUTPUT VALUE OF ACCELERATION SENSOR
Z: Z-AXIS OUTPUT VALUE OF ACCELERATION SENSOR

MIRROR DISPLAY AND CONTROL
METHOD THEREOF

CROSS-REFERENCE TO RELATED
APPLICATION(S)

This application is a bypass continuation of International Application No. PCT/KR2024/095969, filed on Aug. 1, 2024, which is based on and claims priority to Korean Patent Application No. 10-2023-0138915, filed on Oct. 27, 2023, in the Korean Intellectual Property Office, the disclosures of which are incorporated by reference herein in their entireties.

BACKGROUND

1. Field

The present disclosure relates to an electronic apparatus and a control method thereof, and more particularly, to an electronic apparatus including a mirror display and a control method thereof.

2. Description of the Related Art

Various types of electronic devices have been developed and supplied in accordance with the development of electronic technology. In particular, display apparatuses used in various places such as homes, offices, public places, and the like, have been continuously developed over the recent years.

For example, the display apparatus may provide various types of services through a mirror display providing both a mirror function and a display function. For example, the mirror display may function a mirror by using its reflectance in case that no image is displayed on the display, and may be operated for an image is visible to a user based on its transmittance in case that the image is played.

SUMMARY

Aspects of embodiments of the disclosure will be set forth in part in the description which follows and, in part, will be apparent from the description, or may be learned by practice of the presented embodiments.

According to an embodiment of the disclosure, an electronic apparatus includes a mirror display configured to be operated in a mirror state and a display state; a sensor; and at least one processor configured to switch an operation state of the electronic apparatus from a horizontal state, in which the mirror display is operated in a horizontal orientation, to a vertical state, in which the mirror display is operated in a vertical orientation, and, while the operation state of electronic apparatus is the vertical state, identify, based on data acquired through the sensor, whether a user is located within a predetermined distance of the electronic apparatus for a predetermined time, and, when it is identified that the user is located within the predetermined distance of the electronic apparatus for the predetermined time, control the mirror display to be operated in the mirror state based on a user gaze location.

According to an embodiment of the disclosure, the at least one processor may be configured to, while the operation state of the electronic apparatus is the horizontal state and the mirror display is operated in the display state, identify whether a predetermined event has occurred for switching the mirror display to the mirror state, and, when it is identified that the predetermined event for switching the mirror display to the mirror state has occurred, switch the operation state of the electronic apparatus from the horizontal state to the vertical state, and control the electronic apparatus to adjust reflectance of the mirror display based on an angle of the mirror display while the operation state of the electronic apparatus is switched from the horizontal state to the vertical state.

According to an embodiment of the disclosure, the at least one processor may be configured to, when a power-off command is received while the mirror display is operated in the display state, control the mirror display to be operated in an ambient state of displaying an ambient image.

According to an embodiment of the disclosure, the at least one processor may be configured to adjust reflectance of the mirror display for the mirror display to be operated as a half mirror in the ambient state.

According to an embodiment of the disclosure, the at least one processor may be configured to, when the mirror display is pivoted while being operated in the ambient state, control the mirror display so that an art graphic object is displayed dynamically based on an angle of the mirror display.

According to an embodiment of the disclosure, the at least one processor may be configured to, when the electronic apparatus is in the vertical state and the mirror display is operated in the mirror state, and a power-off command is received, control the mirror display to maintain the mirror state.

According to an embodiment of the disclosure, the at least one processor may be configured to, when a power-off command is received and the mirror display is being pivoted, identify whether the mirror display is being operated in the display state or the mirror state before being pivoted, and, based on identifying that the mirror display is being operated in the display state before being pivoted, power off the electronic apparatus, and, based on identifying that the mirror display is being operated in the mirror state before being pivoted, control the mirror display to maintain the mirror state.

According to an embodiment of the disclosure, the at least one processor may be configured to, when a power-off command is received and the electronic apparatus is switched from the horizontal state, with the mirror display operating in the display state, to the vertical state with the mirror display operating in the mirror state, identify whether the electronic apparatus is closer to the vertical state based on an angle of the mirror display, and, when it is identified that the electronic apparatus is closer to the vertical state, control the mirror display to maintain the mirror state.

According to an embodiment of the disclosure, the at least one processor may be configured to, when the electronic apparatus is in the horizontal state and the mirror display is operated in the display state, identify whether a predetermined event for switching to the mirror state has occurred, and, when it is identified that the predetermined event for switching the mirror display to the mirror state has occurred, switch the electronic apparatus from the horizontal state to the vertical state, and the mirror display from the display state to the mirror state, and control a content to be displayed in one area of the mirror display.

According to an embodiment of the disclosure, the at least one processor may be configured to identify a user face location based on data acquired through the sensor, and control the mirror display to display information in an area corresponding to the identified user face location.

According to an embodiment of the disclosure, provided is a method of controlling an electronic apparatus including a mirror display, configured to be operated in a mirror state and a display state, and a sensor, the method including switching an operation state of the electronic apparatus from a horizontal state, in which the mirror display is operated in a horizontal orientation, to a vertical state, in which the mirror display is operated in a vertical orientation; and, while the operation state of electronic apparatus is the vertical state identifying, based on data acquired through the sensor, whether a user is located within a predetermined distance of the electronic apparatus for a predetermined time, and, when it is identified that the user is located within the predetermined distance of the electronic apparatus for the predetermined time, controlling the mirror display to be operated in the mirror state based on a user gaze location.

According to an embodiment of the disclosure, the method may further include, while the operation state of the electronic apparatus is the horizontal state and the mirror display is operated in the display state, identifying whether a predetermined event has occurred for switching the mirror display to the mirror state, and, when it is identified that the predetermined event for switching the mirror display to the mirror state has occurred, switching the operation state of the electronic apparatus from the horizontal state to the vertical state, and adjusting reflectance of the mirror display based on an angle of the mirror display while the operation state of the electronic apparatus is switched from the horizontal state to the vertical state.

According to an embodiment of the disclosure, the method may further include, when a power-off command is received while the mirror display is operated in the display state, controlling the mirror display to be operated in an ambient state of displaying an ambient image.

According to an embodiment of the t disclosure, the controlling of the mirror display to be operated in the ambient state may include adjusting reflectance of the mirror display for the mirror display to be operated as a half mirror in the ambient state.

According to an embodiment of the disclosure, provided is a non-transitory computer-readable medium which stores a computer instruction for causing an electronic apparatus including a mirror display, configured to be operated in a mirror state and a display state, and a sensor to perform an operation when executed by a processor of the electronic apparatus, wherein the operation switching an operation state of the electronic apparatus from a horizontal state, in which the mirror display is operated n a horizontal orientation, to a vertical state, in which the mirror display is operated in a vertical orientation; and while the operation state of electronic apparatus is the vertical state, identifying, based on data acquired through the sensor, whether a user is located within a predetermined distance of the electronic apparatus for a predetermined time, and, when it is identified that the user is located within the predetermined distance of the electronic apparatus for the predetermined time, controlling the mirror display to be operated in the mirror state based on a user gaze location.

BRIEF DESCRIPTION OF THE DRAWINGS

Aspects, features, and advantages of embodiments of the present disclosure will become clearer through the following descriptions of embodiments provided with reference to the accompanying drawings.

DETAILED DESCRIPTION

Figure 1:
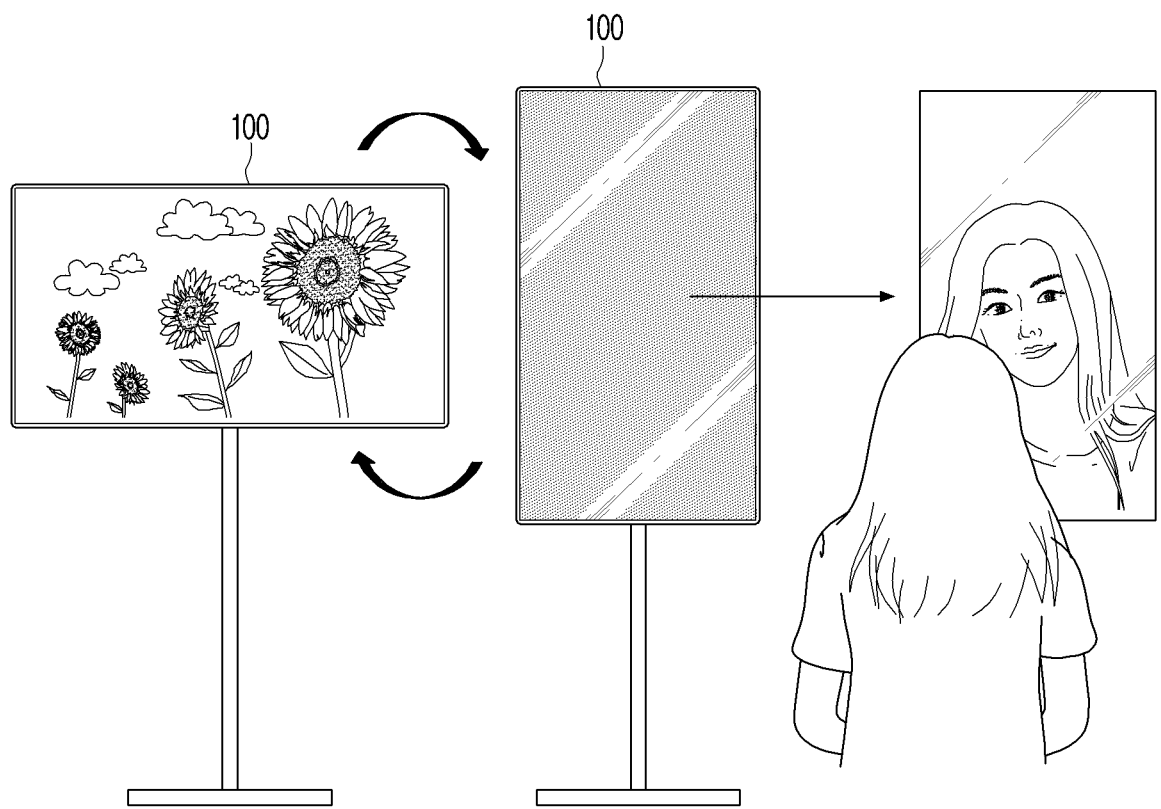
FIG. 1 is a diagram for explaining use of a mirror display according to one or more embodiments.

Terms used in the specification are briefly described, and the present disclosure is then described in detail.

Terms used in embodiments of the present disclosure are currently widely used general terms that are selected as much as possible in consideration of their functions in the present disclosure, and may be changed based on the intentions of those skilled in the art, cases in the art, the emergence of a new technique, or the like. In addition, in a specific case, terms arbitrarily chosen by an applicant may exist. In this case, the meanings of such terms are mentioned in detail in corresponding description portions of the present disclosure. Therefore, the terms used in the present disclosure need to be defined on the basis of the meanings of the terms and the contents throughout the present disclosure rather than simple names of the terms.

In the specification, an expression "have", "may have", "include", "may include", or the like, indicates the existence of a corresponding feature (for example, a numerical value, a function, an operation, or a component such as a part), and does not exclude the existence of an additional feature.

In the present disclosure, an expression "A or B", "at least one of A and/or B", "one or more of A and/or B", or the like, may include all possible combinations of items enumerated together. For example, "A or B", "at least one of A and B"

or "at least one of A or B" may indicate all of 1) a case of including only A, 2) a case of including only B, or 3) a case of including both of A and B.

Expressions "first", "second", or the like, used in the specification may indicate various components regardless of the sequence and/or importance of the components. These expressions are used only to distinguish one component from the other components, and do not limit the corresponding components.

In case that any component (for example, a first component) is mentioned to be "(operatively or communicatively) coupled with/to" or "connected to" another component (for example, a second component), it is to be understood that any component may be directly coupled to another component or may be coupled to another component through still another component (for example, a third component).

An expression "configured (or set) to" used in the present disclosure may be replaced by an expression "suitable for", "having the capacity to", "designed to", "adapted to", "made to" or "capable of" based on a situation. The expression "configured (or set) to" may not necessarily indicate "specifically designed to" in hardware.

Instead, an expression "an apparatus configured to" in any situation may indicate that the apparatus may "perform~" together with another apparatus or component. For example, "a processor configured (or set) to perform A, B and C" may indicate a dedicated processor (for example, an embedded processor) for performing corresponding operations or a general-purpose processor (for example, a central processing unit (CPU) or an application processor) that may perform the corresponding operations by executing one or more software programs stored in a memory device.

A term of a single number may include its plural number unless explicitly indicated otherwise in the context. It is to be understood that a term "include", "configured to", or the like used in this application specifies the existence of features, numerals, steps, operations, components, parts, or combinations thereof, which is mentioned in the specification, and does not preclude the existence or addition of one or more other features, numerals, steps, operations, components, parts, or combinations thereof.

In the embodiments, a "module" or a "~er/or" may perform at least one function or operation, and be implemented in hardware or software, or be implemented by a combination of hardware and software. In addition, a plurality of "modules" or a plurality of "~ers/~ors" may be integrated in at least one module to be implemented by at least one processor (not shown) except for a "module" or a "~er/or" that needs to be implemented by specific hardware.

Meanwhile, various elements and regions in the drawings are schematically shown. Therefore, the spirit of the present disclosure is not limited by relative sizes or intervals shown in the accompanying drawings.

Hereinafter, an embodiment of the present disclosure is described in detail with reference to the accompanying drawings.

FIG. 1 is a diagram for explaining use of a mirror display according to one or more embodiments.

An electronic apparatus 100 according to an embodiment may be implemented as various types of mirror display apparatuses installed in various places where a mirror is needed, and capable of transmitting information while providing a mirror function. Here, a "mirror display" is a compound word of a "mirror" indicating the mirror, and a "display" indicating a task of visually expressing the information. This mirror display may require an ability to provide at least one of the mirror function or a display function in a timely manner based on a user need. As an example, the electronic apparatus 100 may be operated in a display state (or display mode) for providing the display function and a mirror state (or mirror mode) for providing the mirror function.

The electronic apparatus 100 according to an embodiment may be operated in one of a horizontal state and a vertical state, as shown in FIG. 1. For example, the horizontal state where the electronic apparatus 100 is disposed in a horizontal direction may be a display state where a mirror display 110 has a horizontal length longer than its vertical length. In addition, the vertical state where the electronic apparatus 100 is disposed in a vertical direction may be a display state where the mirror display 110 has a vertical length longer than its horizontal length. However, the horizontal state may be referred to as a horizontal posture mode or a landscape mode, and the vertical state may be referred to as a vertical posture mode or a portrait mode. As an example, the electronic apparatus 100 may pivot the mirror display by using a pivot function. However, the display state of the electronic apparatus 100 may not include only the horizontal state and the vertical state. The electronic apparatus 100 may also be operated while tilted at a specific angle (for example, obliquely tilted diagonally) based on a user command.

As an example, the electronic apparatus 100 may be changed from the horizontal state to the vertical state, or changed from the vertical state to the horizontal state, based on the user command. However, in some cases, the display state of the electronic apparatus 100 may be automatically changed based on an image type, an ambient environment, or the like. For example, the electronic apparatus 100 may receive the user command for changing its display state from a user terminal and/or a remote control apparatus, capable of being remotely controlled using an application, such as a smartphone, or receive a user command for changing the display state through a button disposed at the electronic apparatus 100, a user voice, a gesture, or the like. The electronic apparatus 100 may communicate with the user terminal and/or the remote control through a communication method such as wireless fidelity (Wi-Fi) communication, Bluetooth communication, or infrared communication.

According to an example, the electronic apparatus 100 may provide an output state that meets a user intention by considering various factors that may reflect the user need. Hereinafter, various embodiments of the present disclosure are described in detail with reference to the accompanying drawings.

Figure 2:
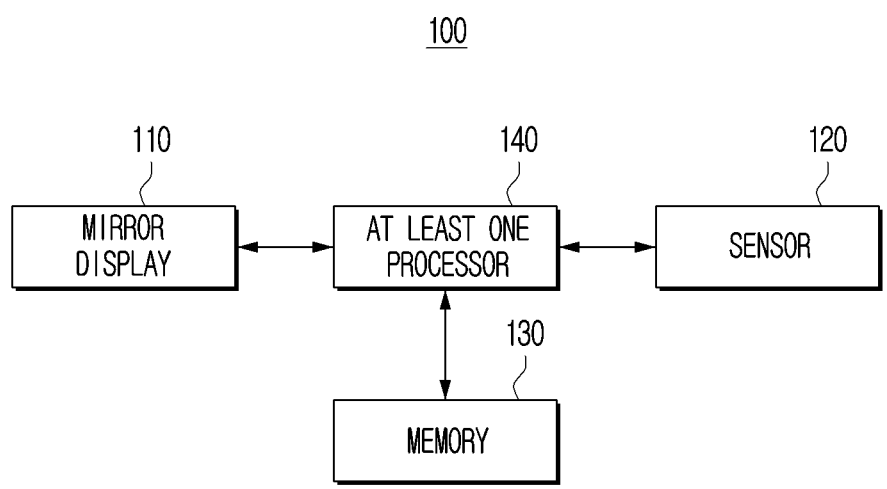
FIG. 2 is a block diagram showing a configuration of an electronic apparatus according to one or more embodiments.

FIG. 2 is a block diagram showing a configuration of an electronic apparatus according to one or more embodiments.

Referring to FIG. 2, the electronic apparatus 100 may include the mirror display 110, a sensor 120, a memory 130, and at least one processor 140. As an example, the electronic apparatus 100 may be implemented as a switchable mirror apparatus providing the mirror function and the display function.

The electronic apparatus 100 may be implemented as various apparatuses having the display function, such as a monitor, a smart monitor, a smart television (TV), an electronic picture frame, an electronic blackboard, an electronic table, a laptop computer, a digital signage, a digital information display (DID), and a video wall.

The mirror display 110 may be implemented as a display including self-light emitting element or a display including a non self-light emitting element and a backlight. For example, the mirror display 110 may be implemented in various types of displays such as a liquid crystal display (LCD), an organic light emitting diode (OLED) display, a light emitting diode (LED) display, a micro light emitting diode (micro LED) display, a mini LED display, a plasma display panel (PDP), a quantum dot (QD) display, and a quantum dot light-emitting diode (QLED) display. The mirror display 110 may also include a driving circuit, a backlight unit, and the like therein, which may be implemented in a form such as an a-si thin film transistor (TFT), a low temperature poly silicon (LTPS) TFT, or an organic TFT (OTFT). As an example, a touch sensor having a form of a touch film, a touch sheet, a touch pad, or the like and detecting a touch operation can be implemented to be disposed on a front surface of the mirror display 110 and detect various types of touch inputs. For example, the mirror display 110 may detect the various types of touch inputs, such as a touch input by a user hand, a touch input by an input apparatus such as a stylus pen, and a touch input by a specific electrostatic material. Here, the input apparatus may be implemented as a pen-type input apparatus that may be referred to by various terms such as an electronic pen, a stylus pen, and an S-pen. As an example, the mirror display 110 may be implemented as a flat display, a curved display, a foldable and/or rollable flexible display, or the like.

Meanwhile, the mirror display 110 may be implemented as a display providing the mirror function and display function.

For example, the mirror display 110 may be implemented by adding the switchable mirror to a general display panel.

Figure 3A:
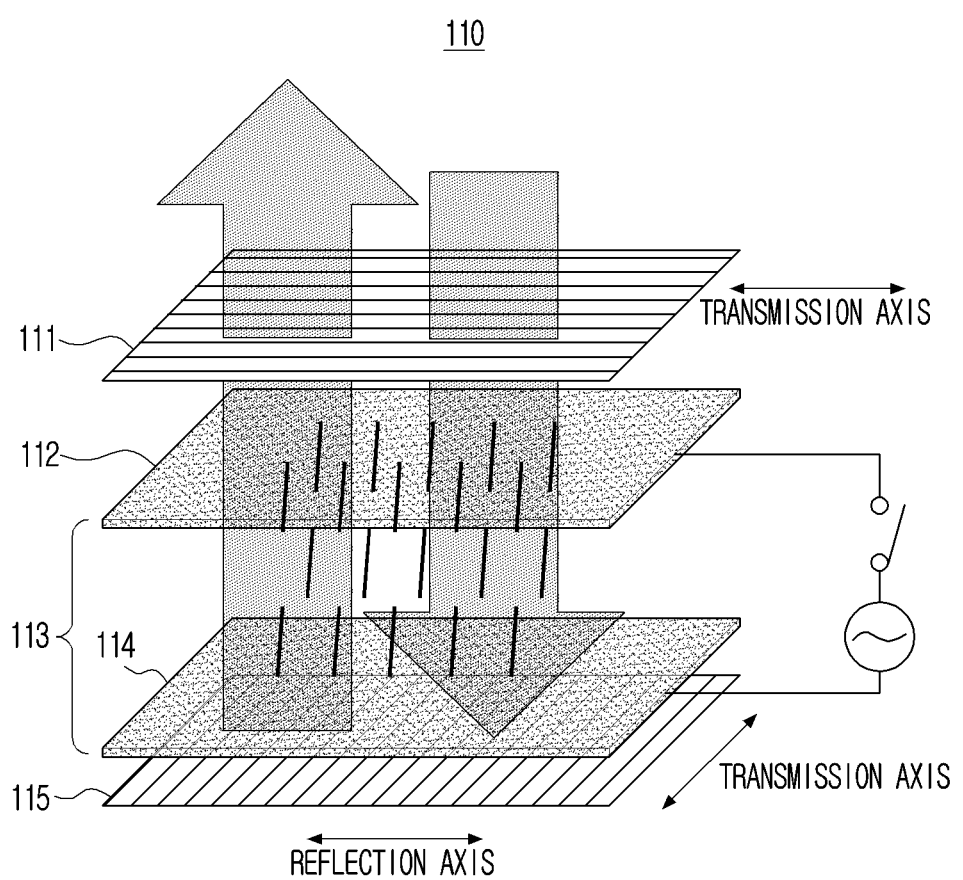
FIGS. 3A and 3B are diagrams for explaining a mirror display structure according to one or more embodiments.
Figure 3B:
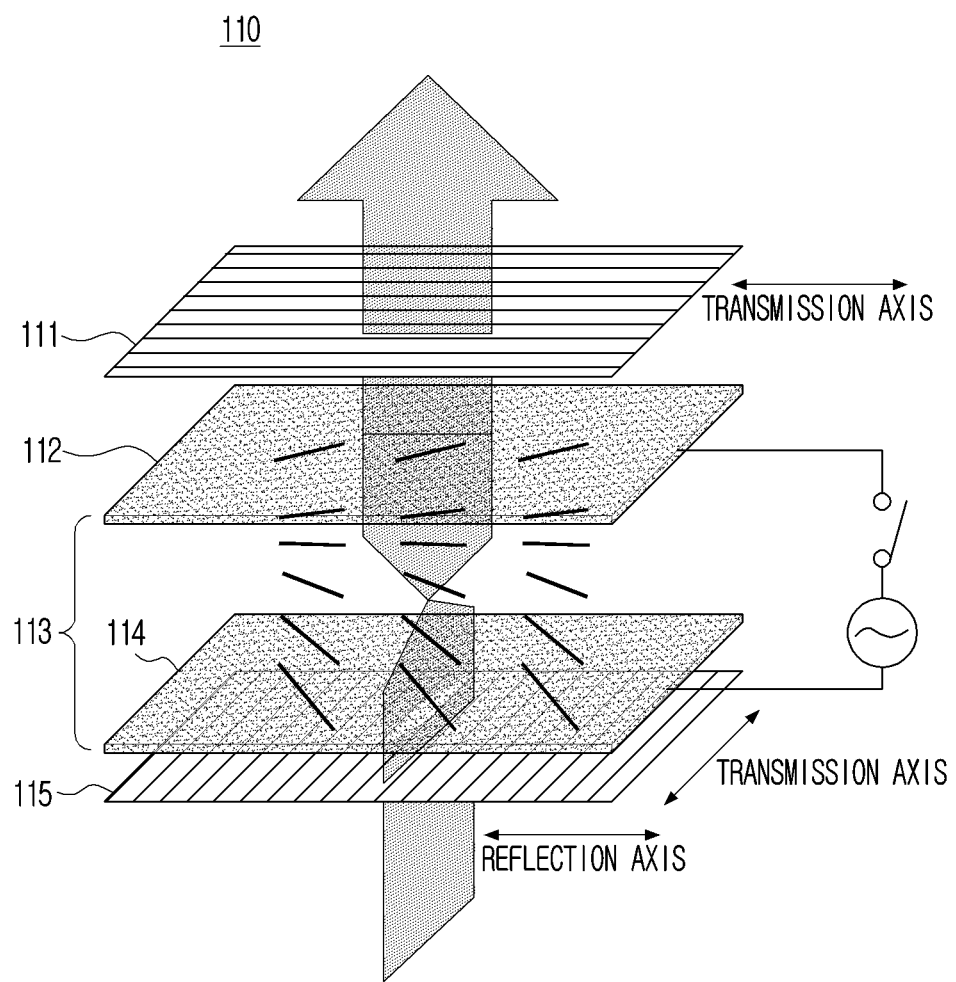

As shown in FIGS. 3A and 3B, the mirror display 110 may be implemented to include a polarizer 111, an upper glass 112, a lower glass 114, and a reflective polarizer 115. As an example, a liquid crystal (LC) layer 113 may be formed between the upper glass 112 and the lower glass 114. A liquid crystal (LC) may be in an intermediate state between liquid and crystal states, and have a structure in which rod-shaped molecules (or liquid crystal molecules) are aligned in one direction, similar to a solid crystal.

As an example, the polarizer 111 may be implemented for polarized light to pass therethrough. As an example, each of the upper glass 112 and the lower glass 114 may be implemented as transparent conductive oxide (TCO) glass, and is not limited thereto.

FIG. 3A shows the mirror display 110 in case that a voltage is powered off. In case that the voltage is powered off, the liquid crystal molecules may maintain the vertical state, and the incident polarized light may directly pass through the liquid crystal (LC) layer 113 as it is to be reflected to a reflection axis of the reflective polarizer 115. Accordingly, the mirror display 110 may be operated in the mirror state.

FIG. 3B shows the mirror display 110 in case that the voltage is powered on. In case that the voltage is powered ON, the liquid crystal molecules may collapse and maintain a twisted state, and the incident polarized light may be pivoted by 90 degrees and pass through the reflection axis of the reflective polarizer 115. Accordingly, the mirror display 110 may be operated in the display state. In addition, based on an implementation example, the mirror display 110 may further include a protective film serving to protect the polarizer, a film serving to classify lights in the polarizer, or the like.

The sensor 120 may sense the presence or absence of a user in front of the electronic apparatus 100, a distance to the user, an approach speed of the user, a current location of the user, a direction (or angle) in which the user is located, a change in the user location within a predetermined time range, an action of the user, etc. In this case, the sensor 120 may be implemented as various types of sensors capable of sensing the user. For example, the sensor 120 may include at least one of a time of flight (ToF) sensor, an ultrasonic sensor, a radio detection and ranging (RADAR) sensor, a photo diode sensor, a proximity sensor, a passive infrared (PIR) sensor, a pinhole sensor, a pinhole camera, an infrared human body detection sensor, a complementary metal-oxide-semiconductor (CMOS) image sensor, a heat detection sensor, a light sensor, or a motion detection sensor. For example, in case of being implemented as the infrared human body detection sensor (for example, an infrared ray (IR) time-of-flight (ToF) sensor), the sensor 120 may sense the user presence or absence, the user approach speed, the current user location, the location change, or the like based on a time in which an emitted infrared ray is reflected and received.

In addition, the sensor 120 may further include at least one sensor capable of sensing an ambient illuminance, an ambient temperature, an incident direction of light, etc. In this case, the sensor 120 may be implemented as an illuminance sensor, a temperature detection sensor, a light quantity sensing layer, a camera, or the like. For example, the illuminance sensor may be disposed inside a glass disposed in the mirror display 110. In this case, a sensing function of the sensor may be controlled to be operated normally even inside the glass through an algorithm that compensates for transmittance/reflectance of the glass disposed in the mirror display 110.

In addition, the sensor 120 may further include at least one of an acceleration sensor (or a gravity sensor), a geomagnetic sensor, or a gyro sensor. For example, the acceleration sensor may be a 3-axis acceleration sensor. The 3-axis acceleration sensor may measure gravitational acceleration for each axis, and provide raw data to the processor 140. The geomagnetic sensor or the gyro sensor may be used to acquire posture information. Here, the posture information may include at least one of roll information, pitch information, or yaw information.

Figure 3C:
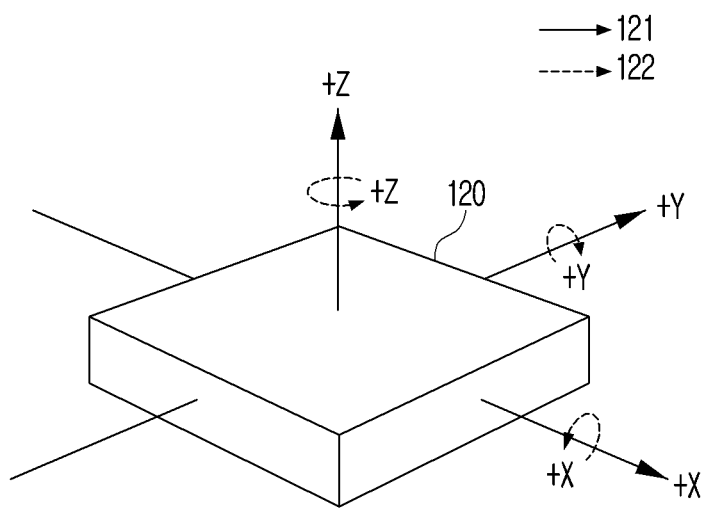
FIG. 3C is a diagram for explaining sensing data acquired by a sensor according to one or more embodiments.

For example, the processor 140 may identify a direction and an angle, at which the mirror display 110 is tilted, based on sensing values of the acceleration sensor and the gyro sensor. For example, as shown in FIG. 3C, the processor 140 may identify the direction and the angle, at which the mirror display 110 is tilted, based on a sensing value of an acceleration sensor 121 and a sensing value of the gyro sensor 122. For example, in case that the X, Y, and Z axes are defined based on the electronic apparatus 100, a roll angle φÕ at which the electronic apparatus 100 is pivoted about the y axis and a pitch angle θ at which the electronic apparatus 100 is pivoted about the x axis may be defined as follows.

$$\varphi = \operatorname{atan}\left(\frac{A_Y}{\sqrt{A_X^2 + A_Z^2}}\right) \quad \text{[Equation 1]}$$

$$\theta = \operatorname{atan}\left(\frac{A_X}{\sqrt{A_Y^2 + A_Z^2}}\right) \quad \text{[Equation 2]}$$

Figure 3D:
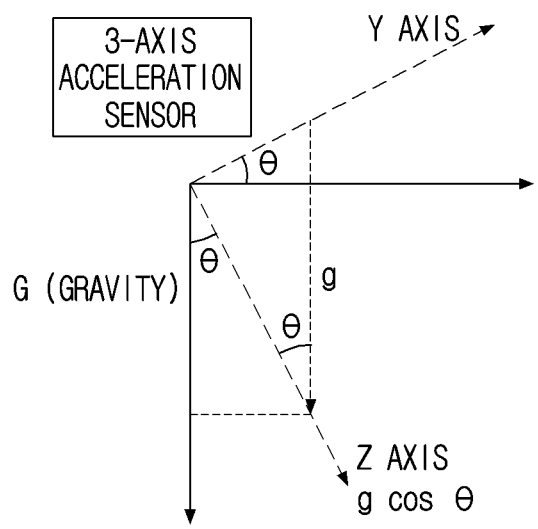
FIG. 3D is a diagram for explaining sensing data acquired by a sensor according to one or more embodiments.

In Equation 1, $A_X$, $A_Y$, and $A_Z$ indicate x-, y-, and z-axis acceleration values of the acceleration sensor disposed at the electronic apparatus 100. For example, the pitch angle θ may be calculated based on a relationship as shown in FIG. 3D.

In addition, the sensor 120 may include various types of sensors such as the illuminance sensor, the touch sensor, a proximity sensor, and a pressure sensor.

The memory 130 may store data necessary for the various embodiments. The memory 130 may be implemented in the form of a memory embedded in an electronic apparatus 100, or may be implemented in the form of a memory detachable from the electronic apparatus 100, based on a data storing purpose. For example, data for driving the electronic apparatus 100 may be stored in a memory embedded in the electronic apparatus 100, and data for an extension function of the electronic apparatus 100 may be stored in the memory detachable from the electronic apparatus 100. Meanwhile, the memory embedded in the electronic apparatus 100 may be implemented as at least one of a volatile memory (for example, a dynamic random access memory (DRAM), a static RAM (SRAM), or a synchronous dynamic RAM (SDRAM)), or a non-volatile memory (for example, an one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash or a NOR flash), a hard drive, or a solid state drive (SSD)). In addition, the memory detachable from the electronic apparatus 100 may be implemented in the form of a memory card (for example, a compact flash (CF), a secure digital (SD), a micro secure digital (Micro-SD), a mini secure digital (Mini-SD), an extreme digital (xD), or a multi-media card (MMC)), an external memory which may be connected to a universal serial bus (USB) port (for example, a USB memory), or the like.

As an example, the memory 130 may store at least one instruction for controlling the electronic apparatus 100 or a computer program including the instructions.

According to another example, the memory 130 may store an input image, that is, an image received from an external apparatus (for example, a source apparatus), an external storage medium (for example, the USB), an external server (for example, a web hard), or the like. Alternatively, the memory 130 may store an image acquired through a camera disposed at the electronic apparatus 100.

As still another example, the memory 130 may store information, algorithms, image quality parameters, or the like for performing at least one of various information required for an image quality processing, for example, noise reduction, detail enhancement, tone mapping, contrast enhancement, color enhancement, or frame rate conversion.

According to an embodiment, the memory 130 may be implemented as a single memory for storing data generated in various operations according to the present disclosure. However, according to another embodiment, the memory 130 may be implemented to include a plurality of memories respectively storing different types of data or respectively storing data generated in different steps.

The memory 130 may store the transmission feature information and reflection feature information of the mirror display 110.

Here, the transmission feature information of the mirror display 110 may include information on a luminance value based on a gray level of an image signal determined based on transmittance of the mirror display 110. For example, luminance feature information of the mirror display 110 may be the luminance measurement value based on the gray level of the image signal. That is, the mirror display 110 may have fixed transmittance. Accordingly, in case of inputting the image signal for each gray level, the luminance value may be acquired based on the gray level of the image signal. That is, an image signal of a zero institute of radio engineers (IRE) (or a black color) to 100 IRE (or a white color) (for example, a gray level image of zero to 255 for an 8-bit image) may be input, and the luminance measurement value based on the gray level of the input image signal may then be calculated and stored in the memory 130. The luminance measurement value based on the gray level of the image signal may also be referred to as a gamma table (or gamma curve). The luminance measurement value may be calculated by being directly measured through an experiment, and also be calculated by being predicted based on the transmittance of the mirror display 110.

Meanwhile, the reflection feature information of the mirror display 110 may include at least one of reflectance information of the mirror display 110 or reflection luminance of the mirror display 110 based on an external light amount. For example, the reflection feature information may be the reflectance itself of the mirror display 110. In this case, the reflection luminance based on the external light amount according to an embodiment of the present disclosure may be calculated based on the external light amount and reflectance, measured by the sensor 120. As another example, the reflection feature information may be information in the form of pre-measured or pre-calculated reflection luminance of the mirror display 110, based on the external light amount. Here, the reflection luminance of the mirror display 110 may be the luminance value generated as external light is reflected based on the reflectance of the mirror display 110.

However, the luminance feature information and reflection feature information of the mirror display 110 may also be received from the external server, or the like. For example, the luminance feature information corresponding to identification information (for example, manufacturing number or model) of the mirror display 110 may be stored in the external server. In this case, the electronic apparatus 100 may receive the information from the external server.

At least one processor 140 may control overall operations of the electronic apparatus 100. In detail, at least one processor 140 may be connected to each component of the electronic apparatus 100 to thus control the overall operations of the electronic apparatus 100. For example, at least one processor 140 may be electrically connected to the mirror display 110 and the memory 130, and control the overall operations of the electronic apparatus 100. At least one processor 140 may be one or more processors.

At least one processor 140 may perform the operation of the electronic apparatus 100 according to the various embodiments by executing at least one instruction stored in the memory 130.

At least one processor 140 may include at least one of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. At least one processor 140 may control one of other components of the electronic apparatus or any combination thereof, and perform an operation related to communication or data processing. At least one processor 140 may execute at least one program or instruction stored in the memory. For example, at least one processor may perform a method according to one or more embodiments of the present disclosure by executing one or more instructions stored in the memory.

The plurality of operations may be performed by one processor or may be performed by the plurality of processors in case that the method according to one or more embodiments of the present disclosure includes the plurality of operations. For example, first operation, a second operation, and a third operation may be performed by the method according to one or more embodiments. In this case, the first operation, the second operation, and the third operation may all be performed by a first processor. Alternatively, the first operation and the second operation may be performed by the first processor (for example, a general-purpose processor), and the third operation may be performed by a second processor (for example, an artificial intelligence-only processor).

At least one processor 140 may be implemented as a single-core processor including a single core, or may be implemented as at least one multi-core processor including multi cores (for example, homogeneous multi cores or heterogeneous multi cores). In case that at least one processor 140 is implemented as the multi-core processor, each of the multi cores included in the multi-core processor may include a processor internal memory such as a cache memory or an on-chip memory, and a common cache shared by the multi cores may be included in the multi-core processor. In addition, each (or some) of the multi cores included in the multi-core processor may independently read and perform a program instruction for implementing the method according to one or more embodiments of the present disclosure, or all (or some) of the multi cores may be linked with each other to read and perform the program instruction for implementing the method according to one or more embodiments of the present disclosure.

In case that the method according to one or more embodiments of the present disclosure includes the plurality of operations, the plurality of operations may be performed by one core among the multi cores included in the multi-core processor, or may be performed by the multi cores. For example, a first operation, a second operation, and a third operation may be performed by the method according to one or more embodiments. In this case, the first operation, the second operation, and the third operation may all be performed by a first core included in the multi-core processor. Alternatively, the first operation and the second operation may be performed by the first core included in the multi-core processor, and the third operation may be performed by a second core included in the multi-core processor.

In the embodiments of the present disclosure, the processor may indicate a system-on-chip (SoC) in which at least one processor and other electronic components are integrated, the single-core processor, the multi-core processor, or the core included in the single-core processor or the multi-core processor. Here, the core may be implemented as the CPU, the GPU, the APU, the MIC, the DSP, the NPU, the hardware accelerator, the machine learning accelerator, or the like. However, the embodiments of the present disclosure are not limited thereto. Hereinafter, for convenience of explanation, at least one processor 140 is referred to as the processor 140.

According to an embodiment, in case that the electronic apparatus 100 is changed from the horizontal state to the vertical state, the processor 140 may identify whether the user is located within a predetermined distance for a predetermined time based on data acquired through the sensor 120. The processor 140 may control the electronic apparatus 100 to be operated in the mirror state based on a user gaze location in case of identifying that the user is located within the predetermined distance from the electronic apparatus 100 and for the predetermined time.

For example, user gaze information may include information on a user gaze location on the mirror display 110. For example, the processor 140 may detect a user face location from a captured image acquired through the camera, and identify the user gaze location by tracking the user face location. The processor 140 may use various conventional methods as a face area detection method. In detail, the processor 140 may use a direct recognition method and a method of using statistics. In the direct recognition method, a regulation may be set using a physical feature such as the outline or skin color of a facial image, a size of its component, or a distance between the components, and comparison, inspection, and measurement may be performed based on the regulation. In the method of using the statistics, the face area may be detected based on a pre-learned algorithm. That is, the method of using the statistics may be a method of converting unique features included in the input facial image into data and analyzing and comparing the data with a large database (of face and other object shapes). In particular, the processor 140 may detect the face area based on the pre-learned algorithm by using methods such as multi layer perceptron (MLP) and support vector machine (SVM).

According to an embodiment, the processor 140 may switch the electronic apparatus 100 from the horizontal state to the vertical state in case of identifying a predetermined event for switching to the mirror state while an operation state of the electronic apparatus 100 is the horizontal state and the mirror display 110 is operated in the display state. The processor 140 may perform fade switching by adjusting the reflectance of the mirror display 110 based on the angle of the mirror display 110 while the electronic apparatus 100 is switched from the horizontal state to the vertical state. As an example, the predetermined event may include the user command, an event where the user gazes at the mirror display 110 within the predetermined distance from the electronic apparatus 100 for the predetermined time, or the like. The user command may be input in various forms such as a button input, the touch input, a gesture command, a voice command, etc.

According to an embodiment, in case of receiving a power-off command, the processor 140 may perform an operation corresponding to the power-off command based on at least one of a current output state or a previous output state. Here, the output state may include the display state and the mirror state. The display state may include a content output state and an ambient state. The content output state (or content output mode) may be a state where a general content is output, and the ambient state (or ambient mode) may be a state where an ambient content such as an art content is output.

According to an example, the processor 140 may control the mirror display 110 to be operated in the ambient state of displaying an ambient image in case of receiving the power-off command while the electronic apparatus 100 is operated from the horizontal state or the vertical state to the display state. For example, the processor 140 may adjust the reflectance of the mirror display 110 for the mirror display 110 to be operated as a half mirror in the ambient state.

According to an example, the processor 140 may control the mirror display 110 for an art graphic object to be displayed dynamically based on the angle of the mirror display 110 in case that the mirror display 110 is pivoted while the electronic apparatus 100 is operated in the ambient state.

According to an example, the processor 140 may control the mirror display 110 to maintain the mirror state in case of receiving the power-off command while the electronic apparatus 100 is operated in the mirror state.

According to an example, the processor 140 may identify whether a state before pivoting is the display state or the mirror state in case of receiving the power-off command of the electronic apparatus 100 while the mirror display 110 is pivoted. The processor 140 may power off the electronic apparatus 100 based on the power-off command in case that the state before pivoting is the display state. The processor 140 may control the mirror display 110 to maintain the mirror state based on the power-off command in case that the state before pivoting is the mirror state.

According to an example, the processor 140 may control the mirror display 110 to maintain the mirror state based on the power-off command if identifying that the electronic apparatus 100 is closer to the vertical state based on the angle of the mirror display 110 in case of receiving the power-off command of the electronic apparatus 100 while the electronic apparatus 100 is switched from the display state in the horizontal state to the mirror state in the vertical state.

According to an embodiment, the processor 140 may switch the electronic apparatus 100 from the horizontal state to the vertical state case of identifying the predetermined event for switching to the mirror state while the electronic apparatus 100 is in the horizontal state and the mirror display 110 is operated in the display state. The processor 140 may control the mirror display 110 to display a content being output in the display state in one area of the mirror display 110 while the electronic apparatus 100 is in the vertical state and the mirror display 110 is operated in the mirror state.

According to an embodiment, the processor 140 may identify the user face location based on the data acquired through the sensor 120. The processor 140 may control the mirror display 110 to display the information in an area corresponding to the identified user face location.

Figure 4:
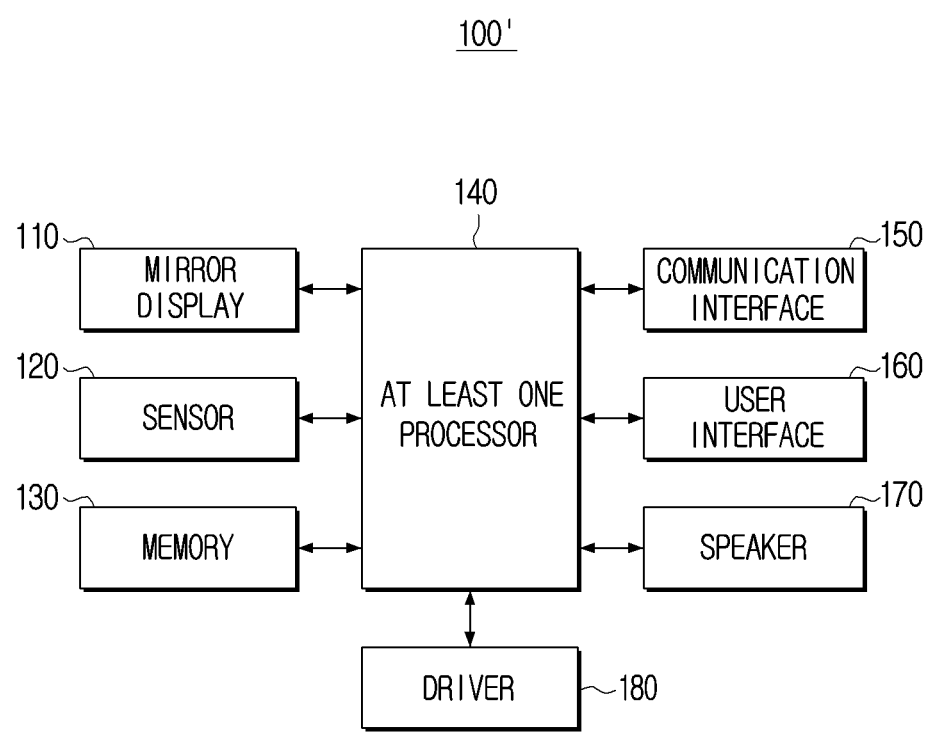
FIG. 4 is a block diagram specifically showing a configuration of an electronic apparatus according to one or more embodiments.

FIG. 4 is a block diagram specifically showing a configuration of an electronic apparatus according to one or more embodiments.

Referring to FIG. 4, the electronic apparatus 100' may include the mirror display 110, the sensor 120, the memory 130, at least one processor 140, a communication interface 150, a user interface 160, a speaker 170, and a driver 180. The description omits a detailed description of components overlapping the components shown in FIG. 2 among the components shown in FIG. 4.

The communication interface 150 may be implemented as various interfaces based on an implementation example of the electronic apparatus 100'. For example, the communication interface 150 may communicate with the external apparatus, the external storage medium (e.g., USB memory), the external server (e.g., web hard), or the like by using a communication method such as a Bluetooth, an access point (AP) based wireless fidelity (Wi-Fi, i.e., wireless local area network (LAN)), a Zigbee, a wired/wireless local area network (LAN), a wide area network (WAN), Ethernet, an IEEE 1394, a high-definition multimedia interface (HDMI), a universal serial bus (USB), a mobile high-definition link (MHL), an audio engineering society/European broadcasting union (AES/EBU) communication, an optical communication, or a coaxial communication. As an example, the communication interface 150 may perform communication with another electronic apparatus, the external server and/or the remote control apparatus, or the like.

The user interface 160 may be implemented as an apparatus such as a button, a touch pad, a mouse, or a keyboard, or may be implemented as a touch screen or the like which may also perform a manipulation input function in addition to the above-described display function.

The speaker 170 may be a component outputting not only various audio data but also various notification sounds, voice messages, or the like. The processor 140 may control the speaker 170 to output feedbacks or various notifications in audio forms according to the various embodiments of the present disclosure.

As an example, the speaker 170 may include a plurality of speakers disposed in different locations. In this case, the processor 140 may control a play state of the plurality of the speakers based on a pivoted direction of the mirror display 110. For example, three speakers may be disposed in three corner areas of the mirror display 110. The processor 140 may control one speaker to silence and use only two speakers based on the pivoted direction of the mirror display 110 (that is detected using the acceleration sensor, for example).

The driver 180 may pivot the mirror display 110. For example, the driver 180 may be connected to a gear (for example, a circular gear) combined with the mirror display 110, and pivots the gear based on the control of the processor 140 to thus pivot the mirror display 110 clockwise or counterclockwise. Alternatively, the driver 180 may stop the pivoting of the mirror display 110 by stopping the pivoting of the gear based on the control of the processor 140. The driver 180 may be implemented in various motors such as a step motor, a direct current electric motor (or DC motor), an alternating current electric motor (or AC motor), and a brushless DC electric motor (or BLDC motor).

In addition, the electronic apparatus 100' may further include a microphone based on an implementation example.

The microphone is a component for receiving the user voice or another sound and converting the same to the audio data. However, according to another embodiment, the electronic apparatus 100' may receive the user voice, which is input through the external apparatus, through the communication interface 150.

Figure 5:
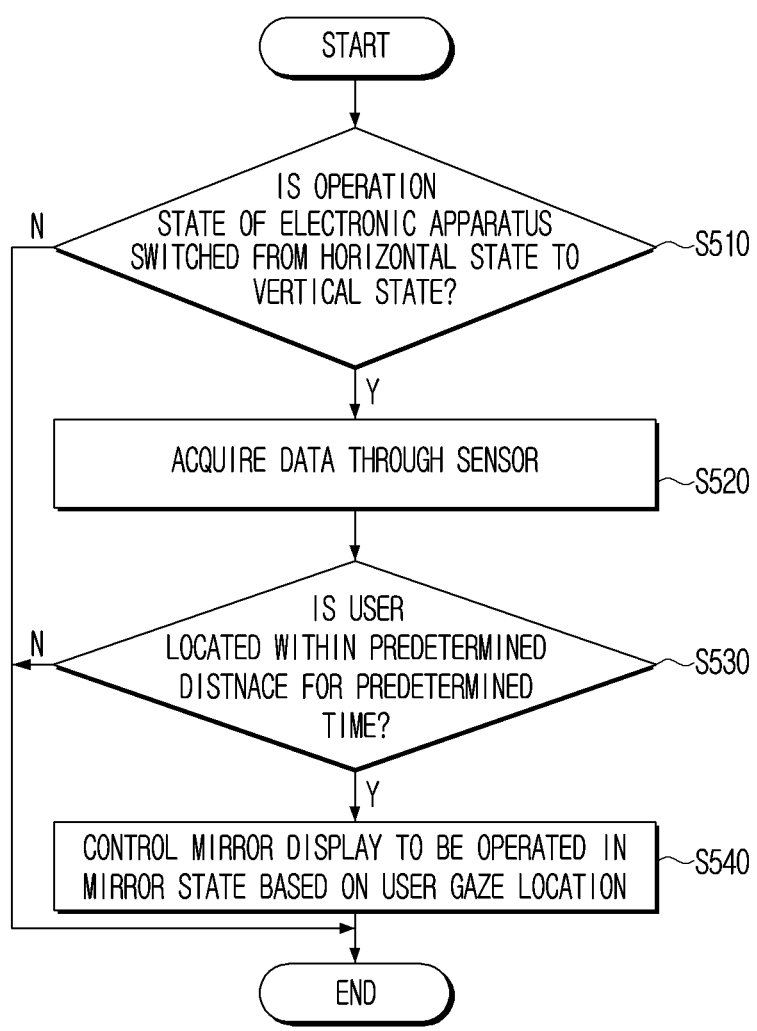
FIG. 5 is a flowchart for explaining a control method of an electronic apparatus according to one or more embodiments.

FIG. 5 is a flowchart for explaining a control method of an electronic apparatus according to one or more embodiments.

Referring to FIG. 5, the electronic apparatus 100 may acquire data through the sensor 120 (S520) in case that the operation state of the electronic apparatus 100 is switched from the horizontal state to the vertical state (S510-Y). Next, the electronic apparatus 100 may identify whether the user is located within the predetermined distance for the predetermined timebased on the data acquired through the sensor 120 (S530). For example, the electronic apparatus 100 may be operated from the horizontal state to the display state.

The electronic apparatus 100 may control the mirror display 110 to be operated in the mirror state based on the user gaze location (S540) in case of identifying that the user is located within the predetermined distance from the electronic apparatus 100 for the predetermined time (530-Y). As an example, the electronic apparatus 100 may control the electronic apparatus 100 to be operated in the mirror state based on the user gaze location in case of identifying that the user gazes at the mirror display 110 for a predetermined time.

Figure 6:
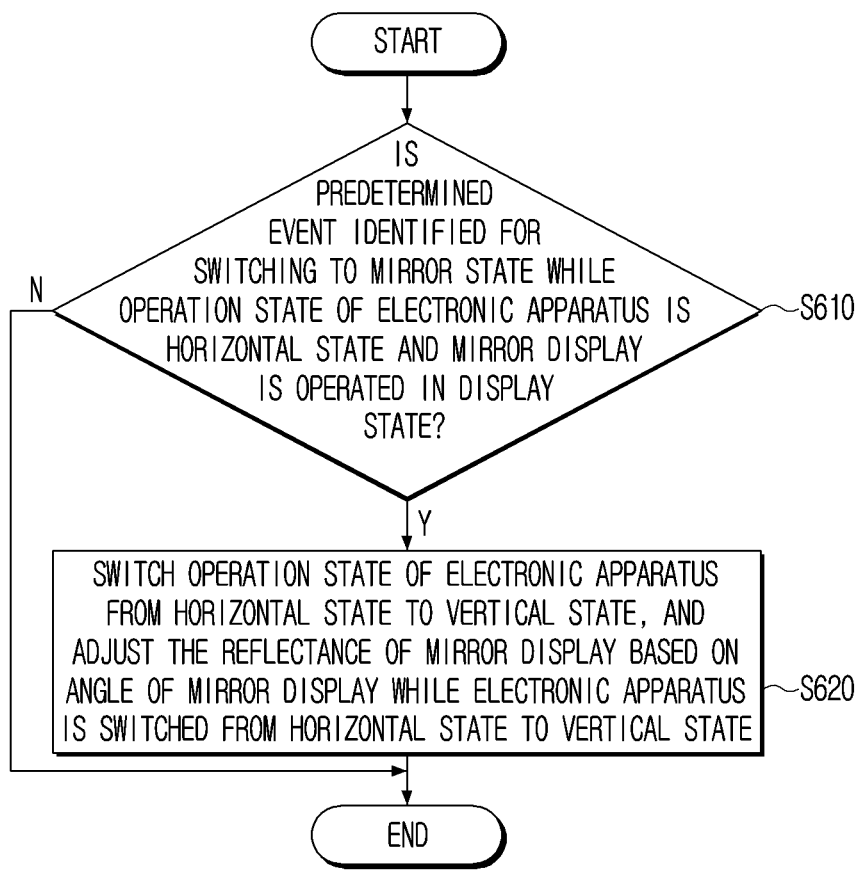
FIG. 6 is a flowchart for explaining a control method of an electronic apparatus according to one or more embodiments.

FIG. 6 is a flowchart for explaining a control method of an electronic apparatus according to one or more embodiments.

Referring to FIG. 6, the electronic apparatus 100 may identify the predetermined event for switching to the mirror state while the operation state of the electronic apparatus 100 is the horizontal state and the mirror display 110 is operated in the display state. The electronic apparatus 100 may switch the operation state from the horizontal state to the vertical state, and adjust the reflectance of the mirror display 110 based on the angle of the mirror display 110 while switched from the horizontal state to the vertical state (S620) in case of identifying the predetermined event for switching to the mirror state while the operation state of the electronic apparatus 100 is the horizontal state and the mirror display 110 is operated in the display state (S610-Y). For example, the electronic apparatus 100 may perform the fade switching by gradually increasing the reflectance of the mirror display 110 while switched from the horizontal state to the vertical state.

Figure 7:
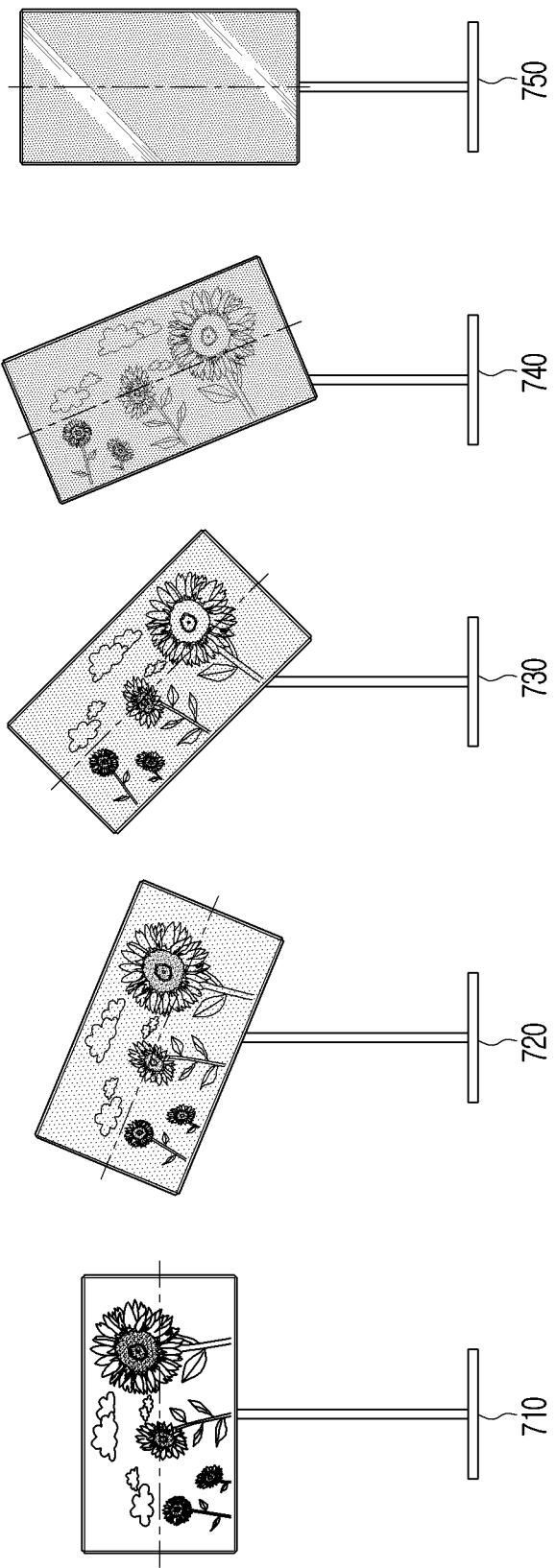
FIG. 7 is a diagram for explaining a fade switching method of the mirror display according to one or more embodiments.

FIG. 7 is a diagram for explaining a fade switching method of the mirror display according to one or more embodiments.

According to an embodiment, in case of identifying the predetermined event for switching to the mirror state while the operation state of the electronic apparatus 100 is the horizontal state and the mirror display 110 is operated in the display state, the electronic apparatus 100 may increase the reflectance from zero % to 100% based on a pivot angle while pivoting the mirror display 110 from the horizontal state to the vertical state. For example, the predetermined event may include an event such as a voice control, a mirror state switch button by the remote control, and mirror state switching based on situation awareness (e.g., the user distance, gaze, or time). For example, the electronic apparatus 100 may provide a pop-up message through a visual user interface (UI) or a voice, requesting confirmation of switching to the mirror state in case of the situation awareness.

According to an embodiment, the electronic apparatus 100 may identify the information on the direction and the angle, at which the mirror display 110 is tilted, based on the data sensed through at least one of the acceleration sensor (or the gravity sensor), the geomagnetic sensor, or the gyro sensor. The acceleration sensor may be the 3-axis acceleration sensor. The 3-axis acceleration sensor may measure the gravitational acceleration for each axis, and provide the raw data to the processor 140. The geomagnetic sensor or the gyro sensor may be used to acquire the posture information. Here, the posture information may include at least one of the roll information, the pitch information, or the yaw information.

For example, the processor 140 may identify the direction and the angle, at which the mirror display 110 is tilted, based on the sensing values of the acceleration sensor and the gyro sensor. For example, as shown in FIG. 3C, the processor 140 may identify the direction and the angle, at which the mirror display 110 is tilted, based on the sensing value of the acceleration sensor 121 and the sensing value of the gyro sensor 122.

Referring to FIG. 7, for example, the reflectance of the mirror display 110 may be zero % (710) in case that the electronic apparatus 100 is in the horizontal state and the mirror display 110 is operated in the display state.

Next, the electronic apparatus 100 may increase the reflectance of the mirror display 110 from more than zero % to less than 50% based on the angle of the mirror display 110 (720) in case that the mirror display 110 is pivoted to an angle greater than zero degrees and less than 45 degrees based on the horizontal state.

Next, the electronic apparatus 100 may increase the reflectance of the mirror display 110 to 50% based on the angle of the mirror display 110 (730) in case that the mirror display 110 is pivoted to an angle of 45 degrees.

Next, the electronic apparatus 100 may increase the reflectance of the mirror display 110 from more than 50% to less than 100% based on the angle of the mirror display 110 (740) in case that the mirror display 110 is pivoted to an angle greater than 45 degrees and less than 90 degrees.

Next, the electronic apparatus 100 may increase the reflectance of the mirror display 110 to 100% (750) in case that the mirror display 110 is pivoted by a 90 degree angle to be changed to the vertical state.

Figure 8:
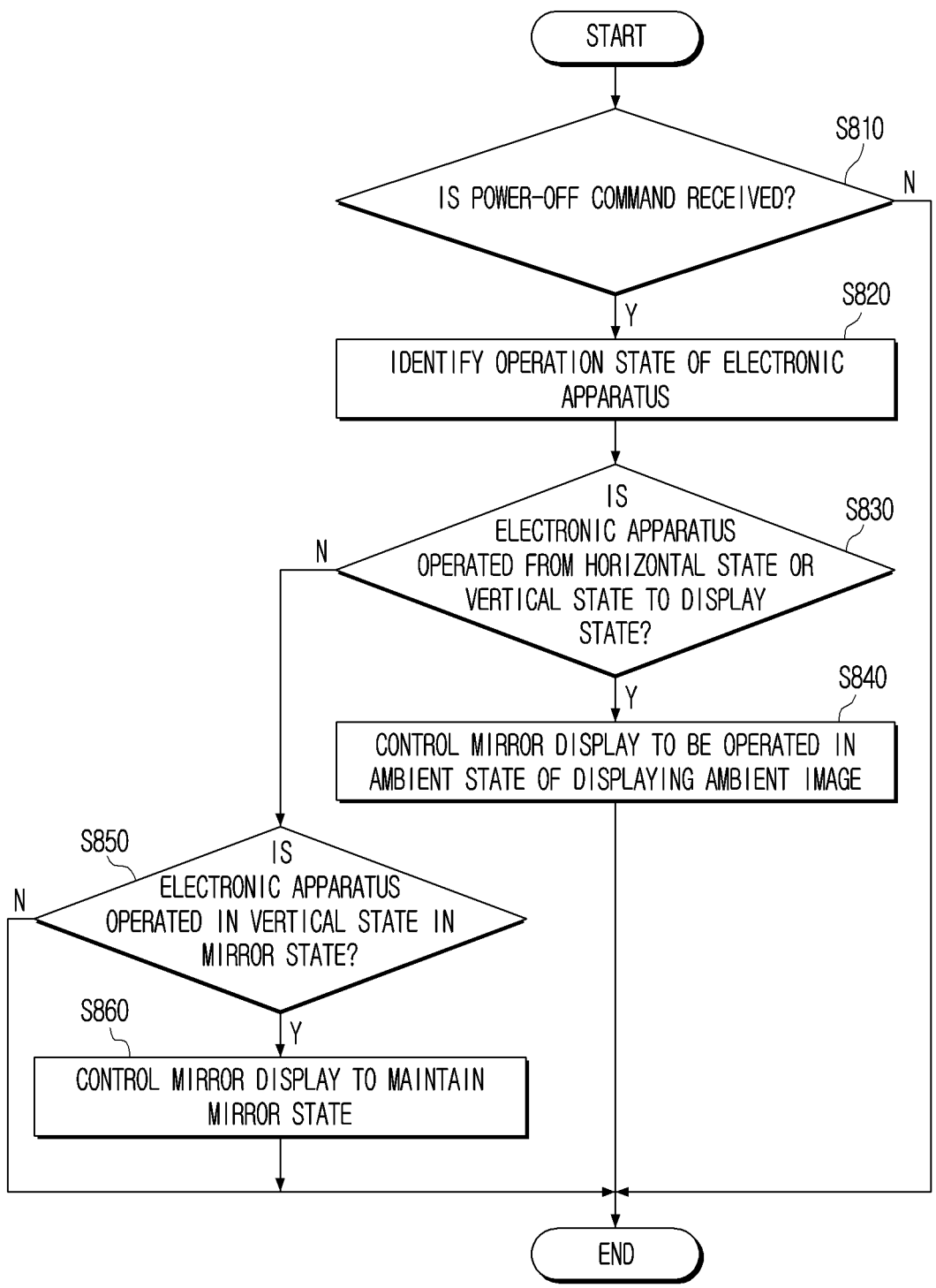
FIG. 8 is a diagram for explaining a control method of an electronic apparatus according to one or more embodiments.

FIG. 8 is a diagram for explaining a control method of an electronic apparatus according to one or more embodiments.

Referring to FIG. 8, the electronic apparatus 100 may identify the operation state of the electronic apparatus 100 and the output state of the mirror display 110 (S820) in case of receiving the power-off command (S810-Y). For example, the operation state of the electronic apparatus 100 may include the horizontal state and the vertical state. For example, the output state of the mirror display 110 may include the display state and the mirror state.

The electronic apparatus 100 may control the mirror display 110 to be operated in the ambient state of displaying the ambient image (S840) in case of receiving the power-off command while the operation state of the electronic apparatus 100 is operated from the horizontal state or the vertical state to the display state (S830-Y). As an example, the electronic apparatus 100 may control the mirror display 110 for the mirror display 110 to be operated as the half mirror in the ambient state.

The electronic apparatus 100 may control the mirror display 110 to maintain the mirror state (S860) in case of receiving the power-off command while the operation state of the electronic apparatus 100 is the vertical state and the mirror display 110 is operated in the mirror state (S850-Y).

Figure 9:
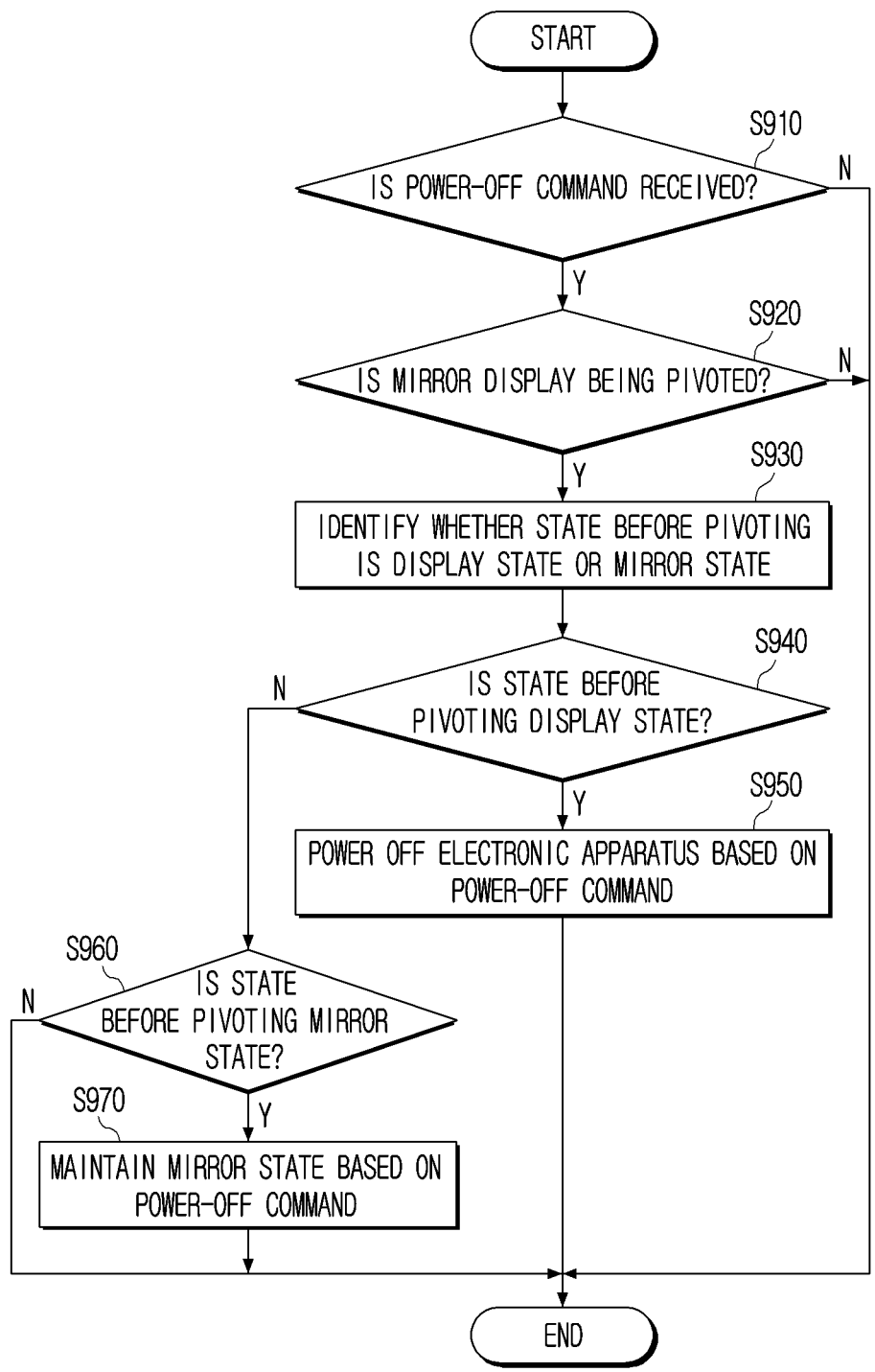
FIG. 9 is a flowchart for explaining a control method of an electronic apparatus according to one or more embodiments.

FIG. 9 is a flowchart for explaining a control method of an electronic apparatus according to one or more embodiments.

Referring to FIG. 9, the electronic apparatus 100 may identify that the mirror display 110 is being pivoted (S920) in case of receiving the power-off command (S910-Y).

The electronic apparatus 100 may identify whether a state before pivoting is the display state or the mirror state (S930) in case of identifying that the mirror display 110 is being pivoted (S920-Y).

The electronic apparatus 100 may power off the electronic apparatus 100 based on the power-off command (S950) in case that the state before pivoting is the display state (S940-Y). For example, in case of receiving the power-off command while the mirror display 110 is pivoted to be switched from the display state in the horizontal state to the mirror state in the vertical state, the electronic apparatus 100 may power off the electronic apparatus 100.

The electronic apparatus 100 may identify whether the state before pivoting is the mirror state (S960) in case that the state before pivoting is not the display state (S940-N).

The electronic apparatus 100 may control the mirror display 110 to maintain the mirror state based on the power-off command (S970) in case that the state before pivoting is the mirror state (S960-Y). For example, the electronic apparatus 100 may maintain the mirror state of the mirror display 110 in case of receiving the power-off command while the mirror display 110 is being pivoted for the electronic apparatus 100 to be switched to the display state in the horizontal state in case that the operation state of the electronic apparatus 100 is the vertical state and the mirror display 110 is in the mirror state.

Meanwhile, according to another embodiment, the electronic apparatus 100 may determine the output state of the mirror display 110 based on the angle of the display 110 if receiving the power-off command while the mirror display 110 is pivoted in the vertical direction in case that the operation state of the electronic apparatus 100 is the horizontal state and the mirror display 110 is in the mirror state.

As an example, the electronic apparatus 100 may control the mirror display 110 to maintain the mirror state based on the power-off command in case of identifying that the angle of the mirror display 110 is closer to the vertical state.

For example, the electronic apparatus 100 may identify whether the angle of the mirror display 110 is closer to the horizontal state or the vertical state if receiving the power-off command while the mirror display 110 is switched to the vertical state in the mirror state in case that the operation state of the electronic apparatus 100 is the horizontal state and the mirror display 110 is in the display state. For example, in case that a tilt angle of the mirror display 110 is closer to the horizontal state, the electronic apparatus 100 may identify the output state desired by the user as the display state, and power off its power. In addition, in case that the tilt angle of the mirror display 110 is closer to the vertical state, the electronic apparatus 100 may identify the output state desired by the user as the mirror state, and power off its power.

Figure 10:
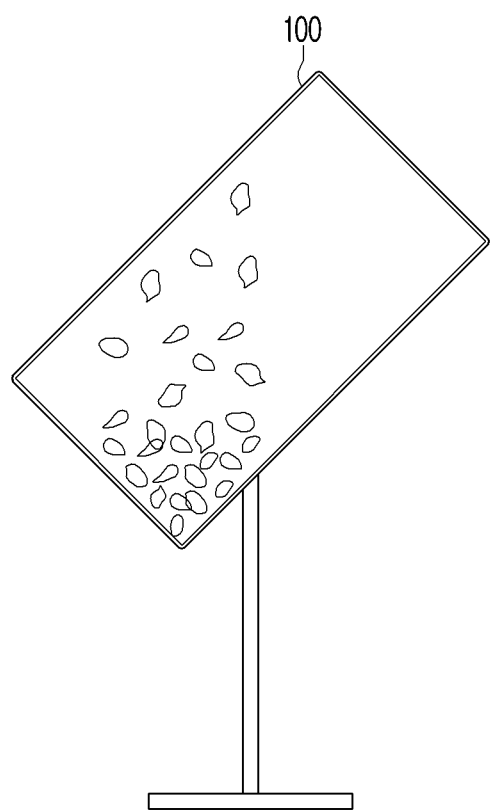
FIG. 10 is a diagram for explaining a control method of an electronic apparatus according to one or more embodiments.

FIG. 10 is a diagram for explaining a control method of an electronic apparatus according to one or more embodiments.

According to an embodiment, in case that the mirror display 110 is pivoted while operated in the ambient state, the electronic apparatus 100 may dynamically display the art graphic object based on the angle of the mirror display 110.

For example, as shown in FIG. 10, in case that the mirror display 110 is pivoted while operated in the ambient state, the electronic apparatus 100 may provide an art graphic in which graphics of falling petals fall in a direction in which the mirror display 110 is tilted, based on the angle of the mirror display 110. For example, a type of art graphic may be determined based on at least one of a type of the art content, predetermined content information, or a context of the electronic apparatus 100, provided in the ambient state. The context of the electronic apparatus 100 may include information such as current time or weather. For example, in case that the current weather is rainy, the electronic apparatus 100 may provide an art graphic in which raindrops fall in the direction in which the mirror display 110 is tilted.

Figure 11:
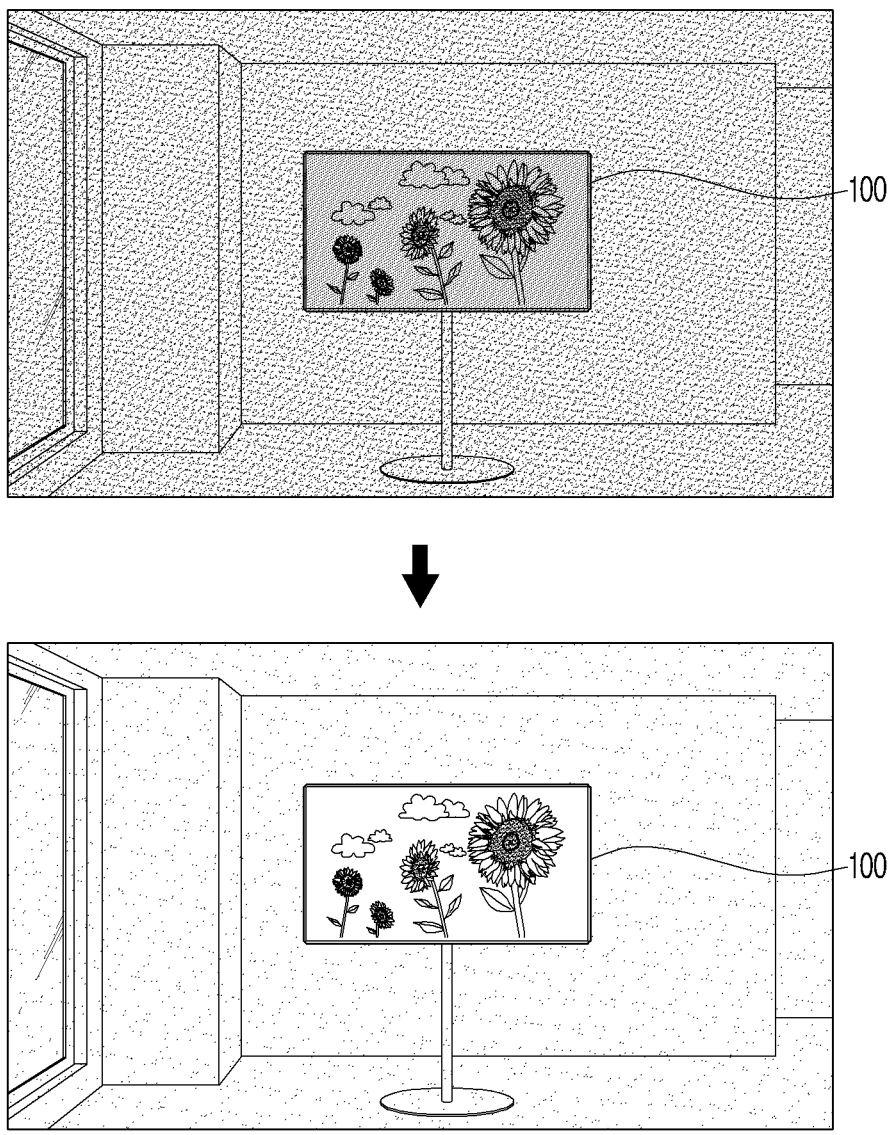
FIG. 11 is a diagram for explaining a control method of an electronic apparatus according to one or more embodiments.

FIG. 11 is a diagram for explaining a control method of an electronic apparatus according to one or more embodiments.

According to an embodiment, in the case of the ambient state, the electronic apparatus 100 may adjust at least one of the reflectance or display brightness of the mirror display 110 based on the ambient brightness sensed through the illuminance sensor. Accordingly, the user may secure a comfortable view.

For example, as shown in FIG. 11, in case of the ambient state, the electronic apparatus 100 may reduce the brightness of the mirror display 110 and increase its reflectance if ambient brightness is below predetermined brightness. For example, in case that the ambient brightness is reduced from 100% to 30%, the electronic apparatus 100 may reduce the display brightness by 70% and increase the reflectance.

Figure 12:
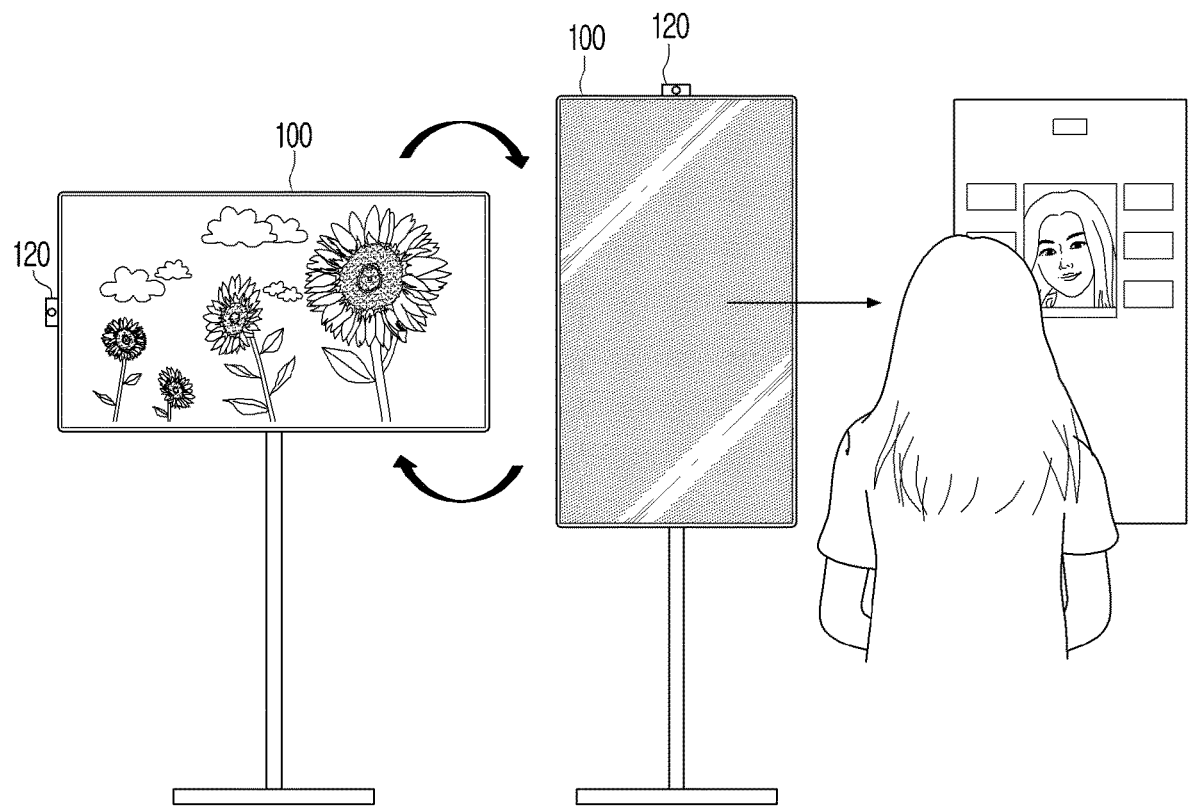
FIG. 12 is a diagram for explaining a control method of an electronic apparatus according to one or more embodiments.

FIG. 12 is a diagram for explaining a control method of an electronic apparatus according to one or more embodiments.

According to an embodiment, the electronic apparatus 100 may identify the user face location (or face height) based on the data acquired through the sensor 120, and display the information in the area corresponding to the identified user face location.

For example, referring to FIG. 12, the electronic apparatus 100 may be used as a beauty display by outputting beauty information to an area where the user face and gaze are located, based on the user face location. For example, the electronic apparatus 100 may classify the mirror display 110 into upper/middle/lower areas, and identify the area corresponding to the area where the user face and gaze are located to thus output the beauty information to the corresponding area. For example, the mirror display 110 may recognize the user touch input and move the information based on a touch drag input.

Figure 13:
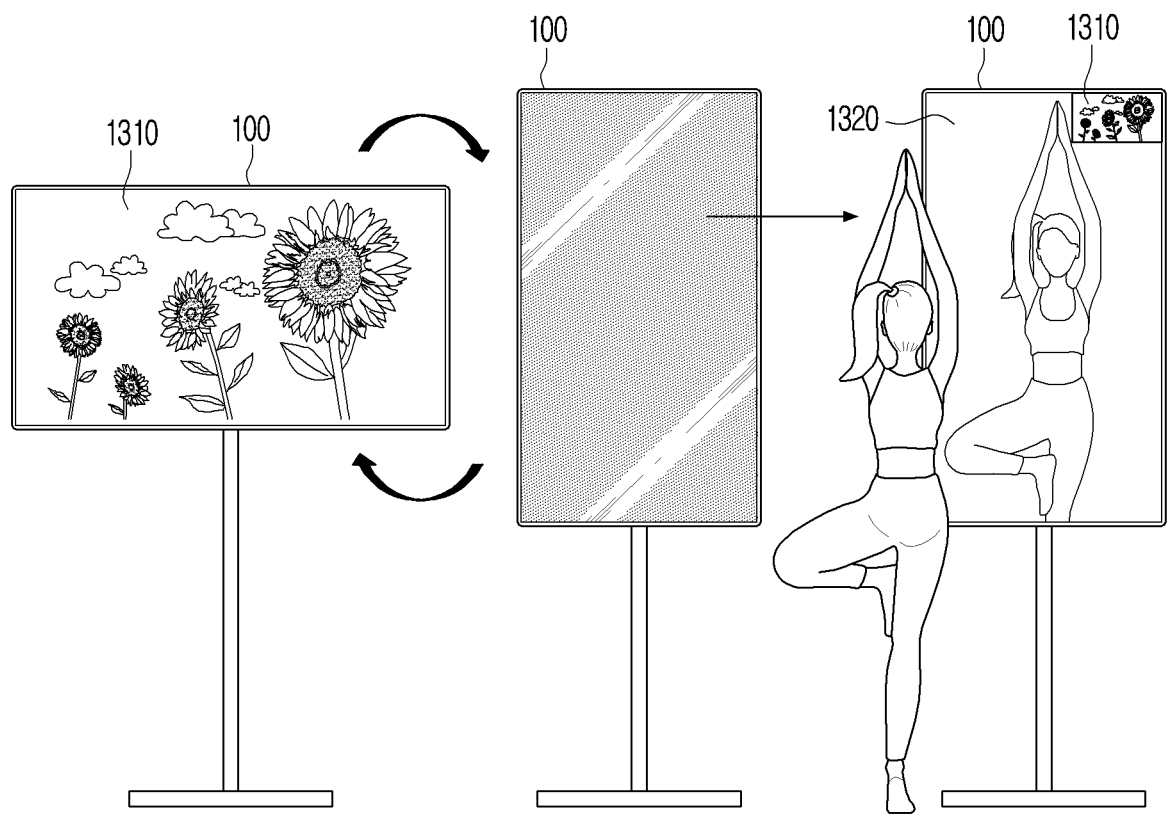
FIG. 13 is a diagram for explaining a control method of an electronic apparatus to one or more embodiments.

FIG. 13 is a diagram for explaining a control method of an electronic apparatus according to one or more embodiments.

According to an embodiment, the electronic apparatus 100 may be switched from the horizontal state to the vertical state in case of identifying the predetermined event for switching to the mirror state while the operation state of the electronic apparatus 100 is the horizontal state, and the mirror display 110 is operated in the display state. Next, the electronic apparatus 100 may display, in one area of the mirror display 110, a content being output in the display state while the operation state of the electronic apparatus 100 is the vertical state and the mirror display 110 is in the mirror state. As an example, the predetermined event may include the user command, the event where the user gazes at the mirror display 110 within the predetermined distance from the electronic apparatus 100 for the predetermined time, etc. The user command may be input in the various forms such as the button input, the touch input, the gesture command, the voice command, etc.

For example, referring to FIG. 13, the electronic apparatus 100 may pivot the mirror display 110 from the horizontal state to the vertical state and be switched to the mirror state in case of identifying the predetermined event for switching to the mirror state while operated in the display state where a content 1310 is output. In addition, the electronic apparatus 100 may output the content 1310, which is output in the display state, to one area of the mirror display 110.

Figure 14:
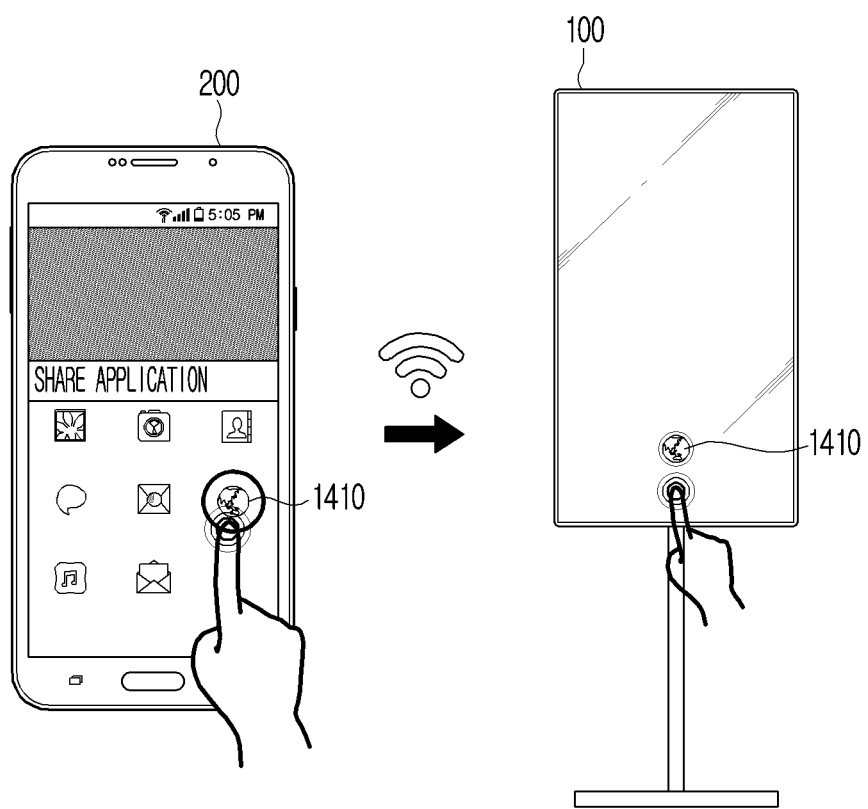
FIG. 14 is a diagram for explaining a control method of an electronic apparatus according to one or more embodiments.

FIG. 14 is a diagram for explaining a control method of an electronic apparatus according to one or more embodiments.

Referring to FIG. 14, a specific application 1410 may be provided on the mirror display 110 of the electronic apparatus 100 in case that the electronic apparatus 100 communicates with a user terminal apparatus 200 while the mirror display 110 is operated in the mirror state, and the corresponding application 1410 is selected on the user terminal apparatus 200. In this case, information on the corresponding application may be transmitted and provided to the electronic apparatus 100, and a screen of the user terminal apparatus 200 may be simply mirrored on a screen of the electronic apparatus 100.

Figure 15:
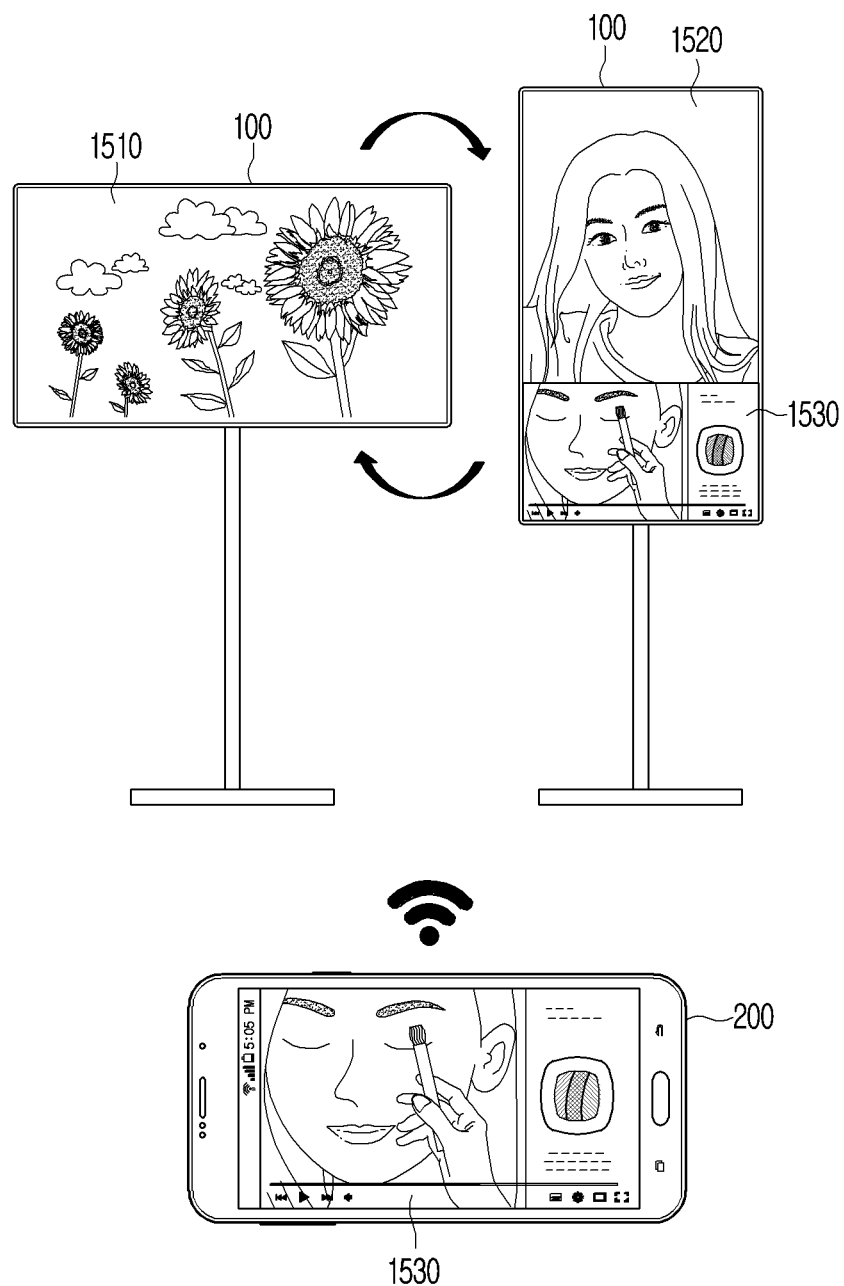
FIG. 15 is a diagram for explaining a control method of an electronic apparatus according to one or more embodiments.

FIG. 15 is a diagram for explaining a control method of an electronic apparatus according to one or more embodiments.

Referring to FIG. 15, the electronic apparatus 100 may pivot the mirror display 110 to be switched to a mirror state 1520 in case that a beauty video 1530 is played on the user terminal apparatus 200 while the communication between the electronic apparatus 100 and the user terminal apparatus 200 is connected and the electronic apparatus 100 is operated in the ambient state of outputting an art content 1510. In addition, the electronic apparatus 100 may output the beauty video 1530 being played on the user terminal apparatus 200 to one area of the mirror display 110.

As set forth above, according to the various embodiments of the present disclosure, at least one of the mirror function and the display function may be provided in the timely manner based on the user need, thereby improving the user convenience.

In addition, the methods according to the various embodiments of the present disclosure described above may be implemented only by software upgrade or hardware upgrade of the conventional electronic apparatus.

In addition, the various embodiments of the present disclosure described above may be performed through an embedded server disposed in the electronic apparatus, or a server disposed outside the electronic apparatus.

Meanwhile, according to an embodiment of the present disclosure, the various embodiments described above may be implemented in software including an instruction stored in a machine-readable storage medium (for example, a computer-readable storage medium). A machine may be an apparatus that invokes the stored instruction from the storage medium, may be operated based on the invoked instruction, and may include the electronic apparatus (e.g., electronic apparatus A) according to the disclosed embodiments. In case that the instruction is executed by the processor, the processor may perform a function corresponding to the instruction directly or by using other components under control of the processor. The instruction may include a code provided or executed by a compiler or an interpreter. The machine-readable storage medium may be provided in the form of a non-transitory storage medium. Here, a term "non-transitory" may only indicate that the storage medium is tangible without including a signal, and does not distinguish whether data are semi-permanently or temporarily stored in the storage medium.

In addition, according to an embodiment of the present disclosure, the methods in the various embodiments described above may be provided by being included in a computer program product. The computer program product may be traded as a product between a seller and a purchaser. The computer program product may be distributed in a form of the machine-readable storage medium (for example, a compact disc read only memory (CD-ROM)), or may be distributed online through an application store (for example, PlayStore™). In case of the online distribution, at least some of the computer program products may be at least temporarily stored in a storage medium such as a memory of a server of a manufacturer, a server of an application store, or a relay server, or be temporarily generated.

In addition, each of the components (for example, modules or programs) according to the various embodiments described above may include one entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Although the embodiments are shown and described in the present disclosure as above, the present disclosure is not limited to the above-mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. An electronic apparatus comprising:
   a mirror display configured to be operated in a mirror state and a display state;
   a sensor; and
   at least one processor configured to:
   switch an operation state of the electronic apparatus from a horizontal state, in which the mirror display is operated in a horizontal orientation, to a vertical state, in which the mirror display is operated in a vertical orientation, and
   while the operation state of electronic apparatus is the vertical state:
   identify, based on data acquired through the sensor, whether a user is located within a predetermined distance of the electronic apparatus for a predetermined time, and
   when it is identified that the user is located within the predetermined distance of the electronic apparatus for the predetermined time, control the mirror display to be operated in the mirror state based on a user gaze location.

2. The apparatus as claimed in claim 1, wherein the at least one processor is configured to:
   while the operation state of the electronic apparatus is the horizontal state and the mirror display is operated in the display state, identify whether a predetermined event has occurred for switching the mirror display to the mirror state, and
   when it is identified that the predetermined event for switching the mirror display to the mirror state has occurred:
   switch the operation state of the electronic apparatus from horizontal state to the vertical state, and
   control the electronic apparatus to adjust reflectance of the mirror display based on an angle of the mirror display while the operation state of the electronic apparatus is switched from the horizontal state to the vertical state.

3. The apparatus as claimed in claim 1, wherein the at least one processor is configured to:
   when a power-off command is received while the mirror display is operated in the display state, control the mirror display to be operated in an ambient state of displaying an ambient image.

4. The apparatus as claimed in claim 3, wherein the at least one processor is configured to:
   adjust reflectance of the mirror display for the mirror display to be operated as a half mirror in the ambient state.

5. The apparatus as claimed in claim 3, wherein the at least one processor is configured to:
   when the mirror display is pivoted while being operated in the ambient state, control the mirror display so that an art graphic object is displayed dynamically based on an angle of the mirror display.

6. The apparatus as claimed in claim 1, wherein the at least one processor is configured to:
   when the electronic apparatus is in the vertical state and the mirror display is operated in the mirror state, and a power-off command is received, control the mirror display to maintain the mirror state.

7. The apparatus as claimed in claim 1, wherein the at least one processor is configured to:
when a power-off command is received and the mirror display is being pivoted, identify whether the mirror display is being operated in the display state or the mirror state before being pivoted, and
based on identifying that the mirror display is being operated in the display state before being pivoted, power off the electronic apparatus, and
based on identifying that the mirror display is being operated in the mirror state before being pivoted, control the mirror display to maintain the mirror state.

8. The apparatus as claimed in claim 1, wherein the at least one processor is configured to:
when a power-off command is received and the electronic apparatus is switched from the horizontal state, with the mirror display operating in the display state, to the vertical state with the mirror display operating in the mirror state,
identify whether the electronic apparatus is closer to the vertical state based on an angle of the mirror display, and
when it is identified that the electronic apparatus is closer to the vertical state, control the mirror display to maintain the mirror state.

9. The apparatus as claimed in claim 1, wherein the at least one processor is configured to:
when the electronic apparatus is in the horizontal state and the mirror display is operated in the display state, identify whether a predetermined event for switching to the mirror state has occurred, and
when it is identified that the predetermined event for switching the mirror display to the mirror state has occurred:
switch the electronic apparatus from the horizontal state to the vertical state, and the mirror display from the display state to the mirror state, and
control a content to be displayed in one area of the mirror display.

10. The apparatus as claimed in claim 1, wherein the at least one processor is configured to:
identify a user face location based on data acquired through the sensor, and
control the mirror display to display information in an area corresponding to the identified user face location.

11. A method of controlling an electronic apparatus including a mirror display, configured to be operated in a mirror state and a display state, and a sensor, the method comprising:
switching an operation state of the electronic apparatus from a horizontal state, in which the mirror display is operated in a horizontal orientation, to a vertical state, in which the mirror display is operated in a vertical orientation; and
while the operation state of electronic apparatus is the vertical state:
identifying, based on data acquired through the sensor, whether a user is located within a predetermined distance of the electronic apparatus for a predetermined time, and
when it is identified that the user is located within the predetermined distance of the electronic apparatus for the predetermined time, controlling the mirror display to be operated in the mirror state based on a user gaze location.

12. The method as claimed in claim 11, further comprising:
while the operation state of the electronic apparatus is the horizontal state and the mirror display is operated in the display state, identifying whether a predetermined event has occurred for switching the mirror display to the mirror state, and
when it is identified that the predetermined event for switching the mirror display to the mirror state has occurred:
switching the operation state of the electronic apparatus from the horizontal state to the vertical state, and
adjusting reflectance of the mirror display based on an angle of the mirror display while the operation state of the electronic apparatus is switched from the horizontal state to the vertical state.

13. The method as claimed in claim 11, further comprising:
when a power-off command is received while the mirror display is operated in the display state, controlling the mirror display to be operated in an ambient state of displaying an ambient image.

14. The method as claimed in claim 13, wherein the controlling of the mirror display to be operated in the ambient state includes adjusting reflectance of the mirror display for the mirror display to be operated as a half mirror in the ambient state.

15. A non-transitory computer-readable medium which stores a computer instruction for causing an electronic apparatus including a mirror display, configured to be operated in a mirror state and a display state, and a sensor to perform an operation when executed by a processor of the electronic apparatus, wherein the operation comprises:
switching an operation state of the electronic apparatus from a horizontal state, in which the mirror display is operated in a horizontal orientation, to a vertical state, in which the mirror display is operated in a vertical orientation; and
while the operation state of electronic apparatus is the vertical state:
identifying, based on data acquired through the sensor, whether a user is located within a predetermined distance of the electronic apparatus for a predetermined time, and
when it is identified that the user is located within the predetermined distance of the electronic apparatus for the predetermined time, controlling the mirror display to be operated in the mirror state based on a user gaze location.

16. The non-transitory computer-readable medium as claimed in claim 15, wherein
the operation further comprising:
while the operation state of the electronic apparatus is the horizontal state and the mirror display is operated in the display state, identifying whether a predetermined event has occurred for switching the mirror display to the mirror state, and
when it is identified that the predetermined event for switching the mirror display to the mirror state has occurred:
switching the operation state of the electronic apparatus from the horizontal state to the vertical state, and
adjusting reflectance of the mirror display based on an angle of the mirror display while the operation state of the electronic apparatus is switched from the horizontal state to the vertical state.

17. The method as claimed in claim 15, wherein
the operation further comprising:
when a power-off command is received while the mirror display is operated in the display state, controlling the mirror display to be operated in an ambient state of displaying an ambient image.

18. The method as claimed in claim 17, wherein
the controlling of the mirror display to be operated in the ambient state includes adjusting reflectance of the mirror display for the mirror display to be operated as a half mirror in the ambient state.

19. The method as claimed in claim 15, wherein
the operation further comprising:
when the mirror display is pivoted while being operated in the ambient state, controlling the mirror display so that an art graphic object is displayed dynamically based on an angle of the mirror display.

20. The method as claimed in claim 15, wherein
the operation further comprising:
when the electronic apparatus is in the vertical state and the mirror display is operated in the mirror state, and a power-off command is received, controlling the mirror display to maintain the mirror state.

\* \* \* \* \*